US008950733B2

(12) United States Patent
Collins

(10) Patent No.: US 8,950,733 B2
(45) Date of Patent: Feb. 10, 2015

(54) HYDRAULIC SYSTEM FOR LIFTING A CRANE ON A VEHICLE

(75) Inventor: John Collins, Garner, IA (US)

(73) Assignee: American Crane, Inc., Garner, IA (US)

( * ) Notice: Subject to any disclaimer, the term of this patent is extended or adjusted under 35 U.S.C. 154(b) by 317 days.

(21) Appl. No.: 13/479,043

(22) Filed: May 23, 2012

(65) Prior Publication Data

US 2012/0291428 A1 Nov. 22, 2012

Related U.S. Application Data

(63) Continuation-in-part of application No. 12/607,394, filed on Oct. 28, 2009, now abandoned.

(51) Int. Cl.

| | |
|---|---|
| ***B60S 9/10*** | (2006.01) |
| ***B66C 23/38*** | (2006.01) |
| ***B66C 23/42*** | (2006.01) |

(52) U.S. Cl.

CPC ................. *B66C 23/38* (2013.01); *B66C 23/42* (2013.01)

USPC .................................... 254/93 VA; 254/93 R

(58) Field of Classification Search

USPC ........................................... 254/93 R, 93 VA

See application file for complete search history.

(56) References Cited

U.S. PATENT DOCUMENTS

| | | | | |
|---|---|---|---|---|
| 3,036,433 | A * | 5/1962 | Loup | 60/471 |
| 6,079,576 | A * | 6/2000 | Bosler et al. | 212/278 |
| 2007/0200388 | A1* | 8/2007 | Bakshi et al. | 296/156 |

* cited by examiner

*Primary Examiner* — Lee D Wilson
*Assistant Examiner* — Shantese McDonald
(74) *Attorney, Agent, or Firm* — Davis Brown Law Firm; Emily Harris

(57) ABSTRACT

A hydraulic manifold system for lifting, installing, or repairing large industrial field equipment. The system includes a hydraulic motor, which is fluidly connected to a hydraulic line of a vehicle, which is drivingly connected to a high-pressure hydraulic pump and fluidly connected to above-ground jack, ram, or lifting device. An above-ground jack, ram, or lifting device is hydraulically actuated by the fluid supplied by the hydraulic pump wherein a remote electronic controller can be utilized to provide a signal in order to depressurize the auxiliary device using an electronically actuated valve.

10 Claims, 6 Drawing Sheets

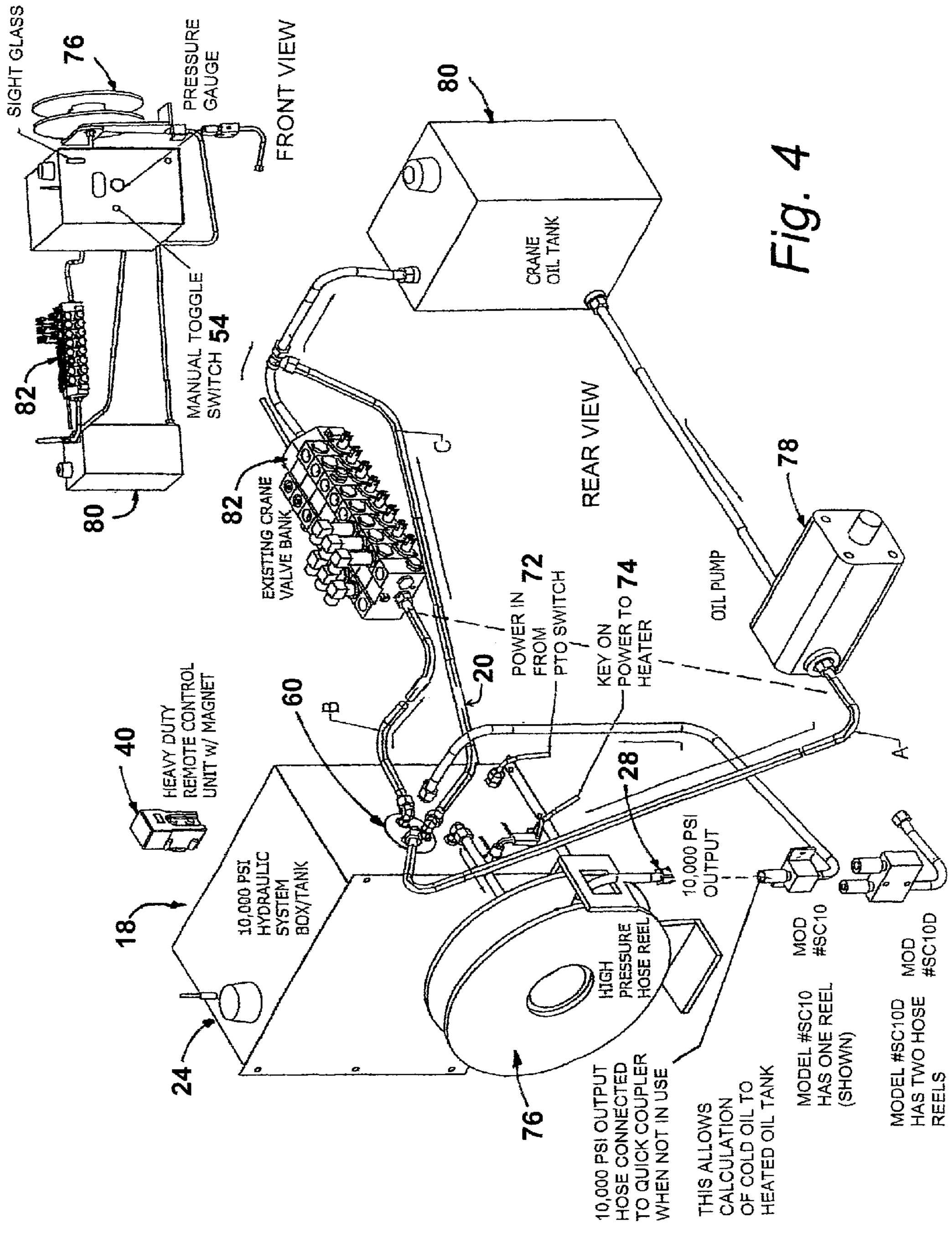
SIGHT GLASS
76
PRESSURE GAUGE
FRONT VIEW
MANUAL TOGGLE SWITCH 54
82
80
CRANE OIL TANK
Fig. 4
REAR VIEW
C
78
EXISTING CRANE VALVE BANK
82
POWER IN FROM PTO SWITCH 72
KEY ON POWER TO HEATER 74
OIL PUMP
HEAVY DUTY REMOTE CONTROL UNIT w/ MAGNET
40
60
B
20
A
28
10,000 PSI OUTPUT
18
10,000 PSI HYDRAULIC SYSTEM BOX/TANK
HIGH PRESSURE HOSE REEL
MOD #SC10
MOD #SC10D
24
76
10,000 PSI OUTPUT HOSE CONNECTED TO QUICK COUPLER WHEN NOT IN USE
THIS ALLOWS CALCULATION OF COLD OIL TO HEATED OIL TANK
MODEL #SC10 HAS ONE REEL (SHOWN)
MODEL #SC10D HAS TWO HOSE REELS

HYDRAULIC SYSTEM FOR LIFTING A CRANE ON A VEHICLE

BACKGROUND OF THE INVENTION

This invention relates to vehicles, which utilize mobile hydraulic cranes. More specifically, this invention relates to a hydraulic system for operating high-pressure hydraulic tools such as above-ground jacks, rams, bead breakers and other auxiliary devices.

Typically, in order to lift, install, or repair large industrial equipment, an air-over hydraulic pump is used to provide high pressure hydraulic oil to the hydraulic high-pressure above-ground jack to raise, install, or repair the equipment from an air compressor, which is mounted on the service vehicle. The crane itself has a tire manipulator with rotating pads, which are used to maneuver the tires. The crane and pads are controlled, using a hydraulic system, which is associated with the vehicle.

These typical field-service vehicles are equipped with an air compressor system, which operates the air-over, hydraulic high-pressure foot pumps, which power the above-ground jacks and rams. Specifically, often in cold weather, the air-operated devices freeze, preventing functioning of the lifting installation or repair device. In addition, the lines in these systems can become dirty and collect moisture, thus facilitating the freezing of lines and preventing operation. In addition, each different type of mobile hydraulic-crane vehicle requires different flow requirements, depending on the lifting, installation, or repair required, wherein an individual application in the field must regulate these flow requirements. The operator must also operate these foot pumps in close proximity of the tire or equipment location, thus putting the individual, who is operating the foot pumps, in danger since d/he is next to the industrial equipment during operation, which limits the operator's line of sight. Finally, foot pumps provide a ratcheting motion, which can lead to unsafe movements and compromise safety.

A principal objective of the present invention is to provide hydraulic system for a mobile hydraulic crane, which facilitates above-ground lifting, installation, or repair of industrial equipment.

Yet another object of the present invention is to provide a hydraulic system which improves the safety associated with operating high pressure above-ground jacks and rams on field service vehicles.

Yet another object of the present invention is to provide a hydraulic crane system that improves the safety associated with use of the system.

These and other objects, features, or advantages of the present invention will become apparent from the specification and claims.

BRIEF SUMMARY OF THE INVENTION

A hydraulic system for the operation of auxiliary devices using a hydraulic manifold fluidly supplied by a service vehicle. This stand-alone hydraulic system is for use with service vehicles that can be utilized independently of the service vehicle's hydraulic system. The system includes a hydraulic motor that is drivingly connected to a hydraulic pump and fluidly connected to a hydraulic line of the vehicle. An auxiliary device is can be utilized by the system that is hydraulically actuated by fluid supplied by the hydraulic pump in the stand-alone system. An electronic controller is electrically connected to the hydraulic pump to cause hydraulic fluid to flow to the pump to lift the device. The electronic controller is also electrically connected to the electrically actuated valve where the valve allows hydraulic fluid to flow from the device back to the hydraulic line of the vehicle to allow the device to be deactivated.

BRIEF DESCRIPTION OF THE DRAWINGS

FIG. 4 is a detailed perspective schematic of a preferred embodiment of the hydraulic system.

DETAILED DESCRIPTION OF THE PREFERRED EMBODIMENT

Figure 1:
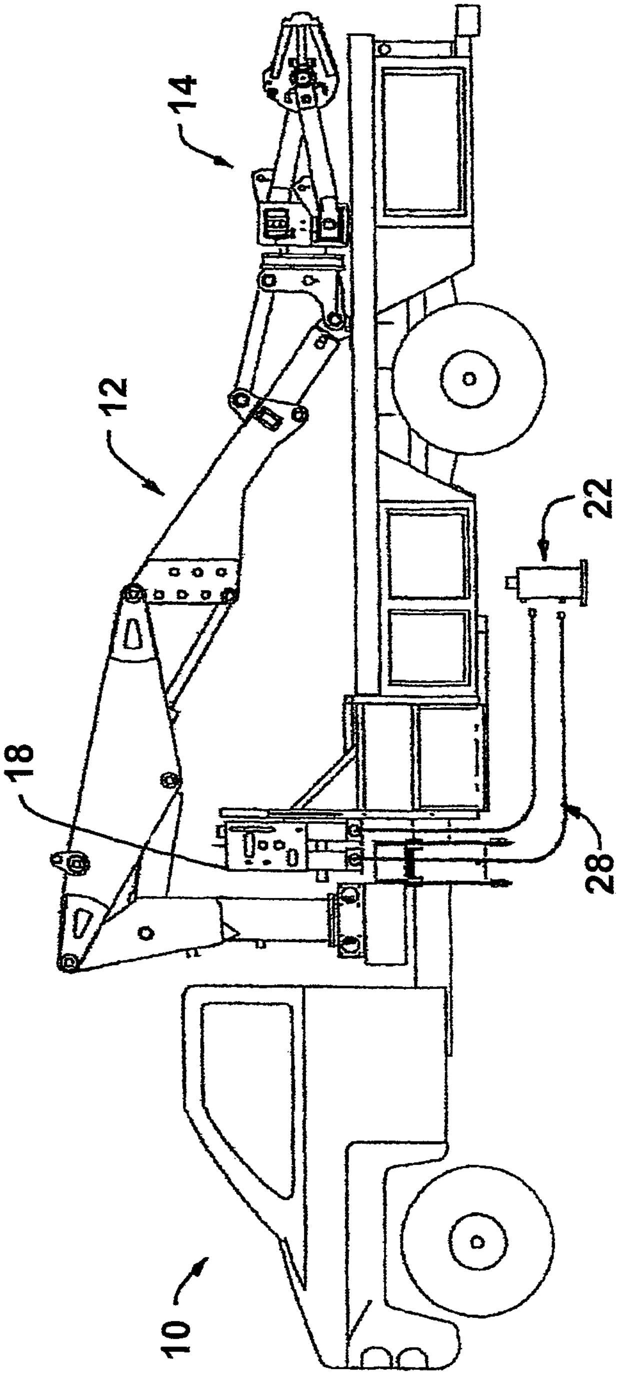
FIG. 1 is a perspective view of a vehicle having a crane attached thereto.
Figure 2:
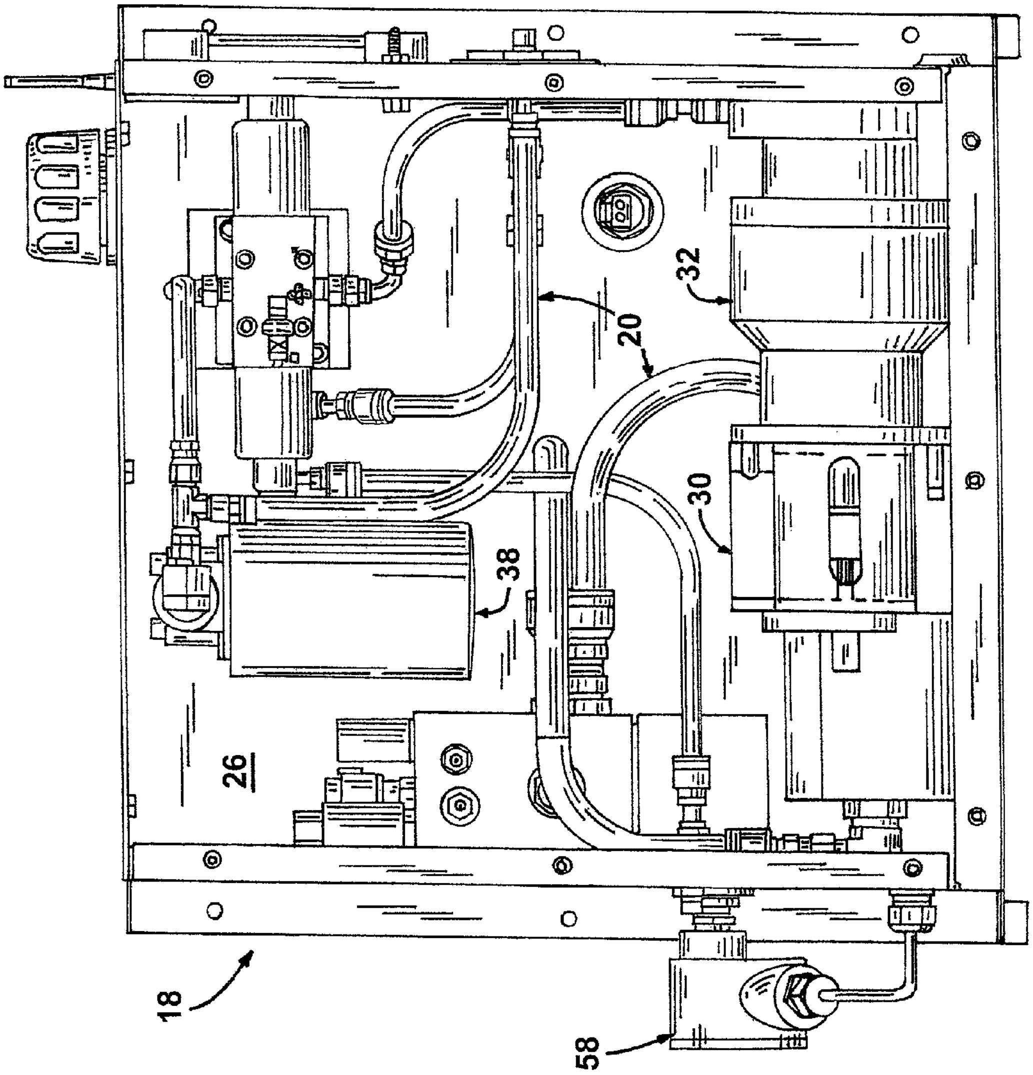
FIG. 2 is a detailed side-view schematic of a preferred embodiment of the hydraulic system.
Figure 3A:
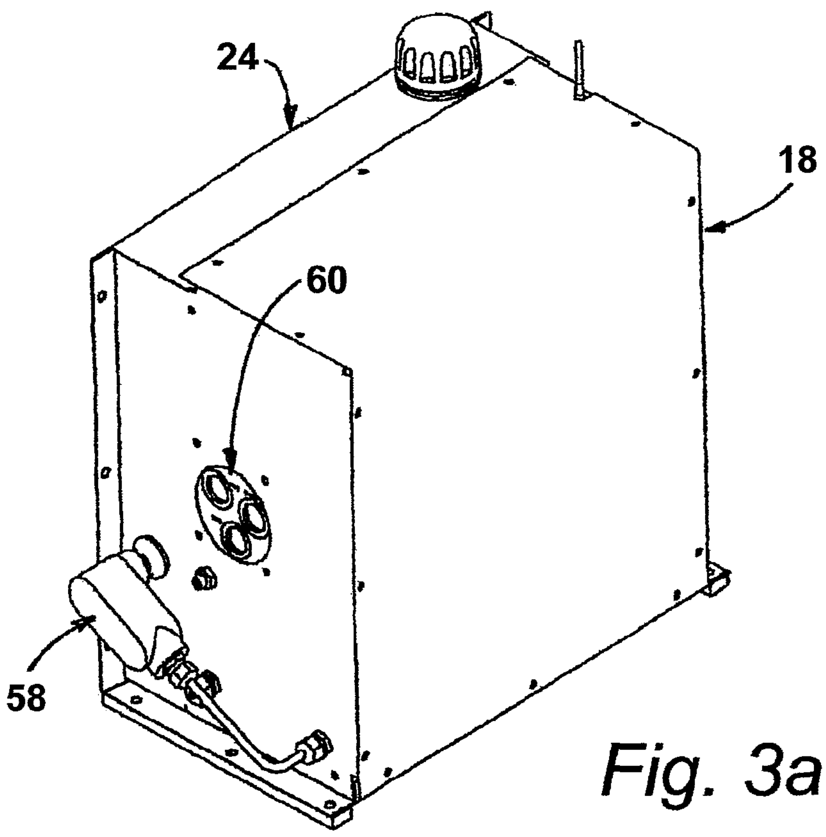
FIG. 3*a* is a perspective view of a schematic diagram of one embodiment of the hydraulic system.
Figure 3B:
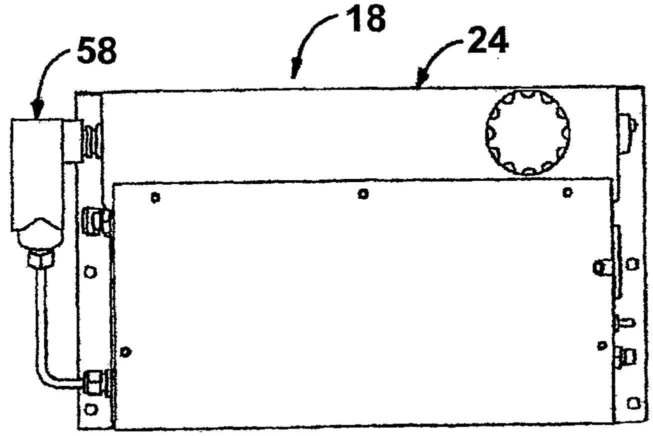
FIG. 3*b* is a side view of a schematic diagram of one embodiment of the hydraulic system.
Figure 3C:
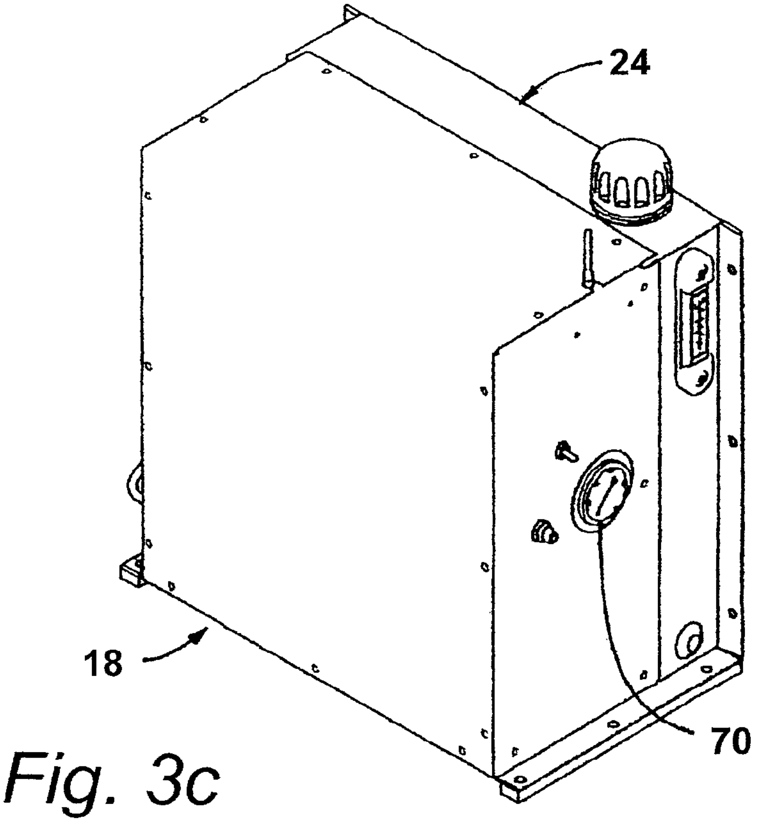
FIG. 3*c* is a perspective view of a schematic diagram of one embodiment of the hydraulic system.
Figure 3D:
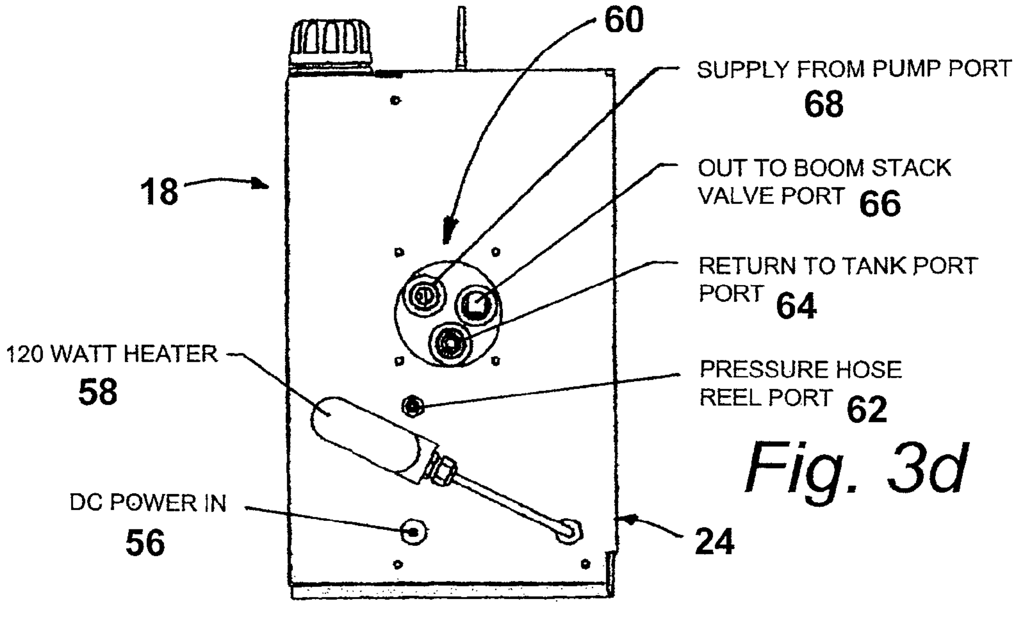
FIG. 3*d* is a first side view of a schematic diagram of one embodiment of the hydraulic system.
Figure 3E:
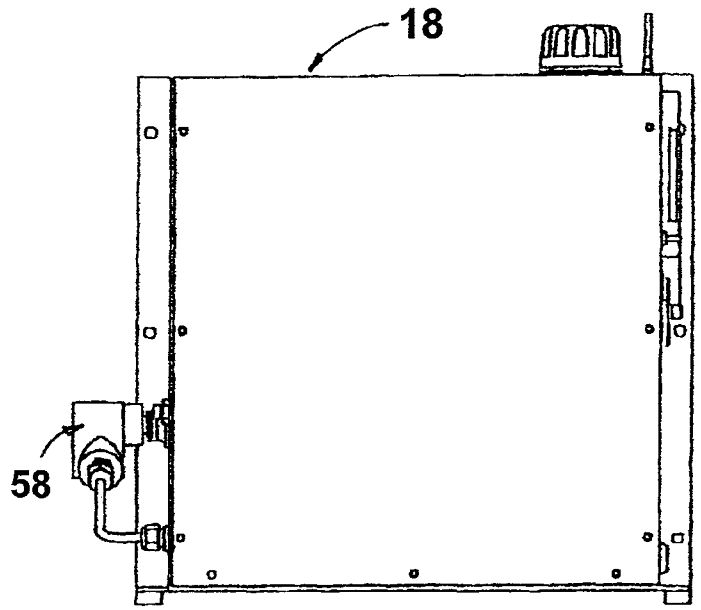
FIG. 3*e* is a side view of a schematic diagram of one embodiment of the hydraulic system.
Figure 3F:
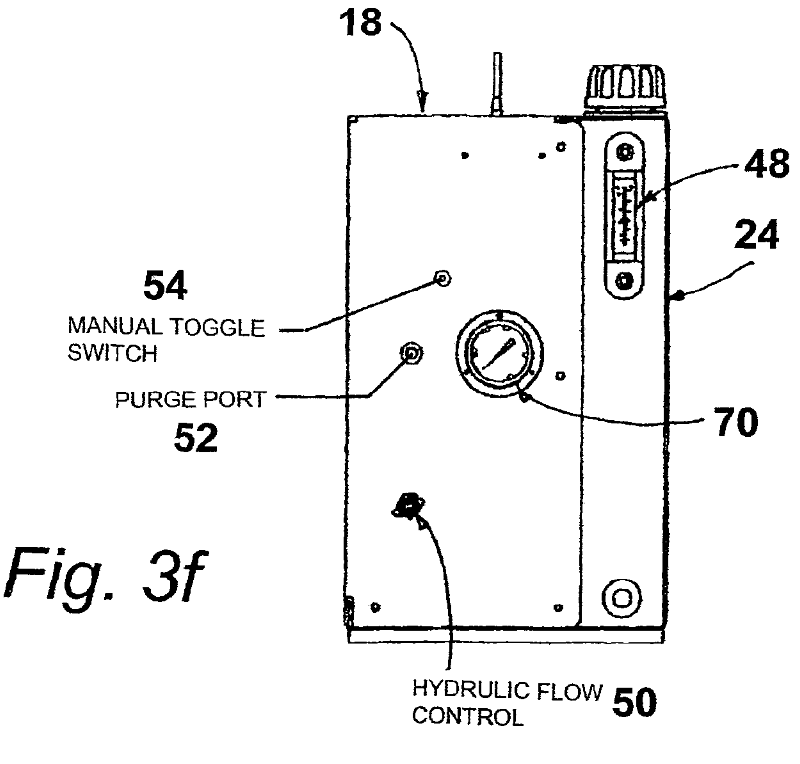
FIG. 3*f* is a second side view of a schematic diagram of one embodiment of the hydraulic system.

FIG. 1 shows a vehicle 10 that holds a crane 12 including rotating pads 14. The rotating pads 14 and crane 12 are typically used to lift heavy duty tires and place them at a desired location. While the vehicle 10 is shown as a commercial truck, the vehicle may be a non-commercial truck, farm implement, industrial backhoe, forklift truck, or the like. The vehicle 10 and crane 12 are operated, utilizing a hydraulic system (not shown), which provides fluid and pressure power to provide directional movement of the rotating pads and the like as is known in the art. The hydraulic system 18 of the present invention is shown, with a high-pressure hydraulic line 28 running to an auxiliary device 22. In this embodiment, it is an above-ground jack, but in other embodiments it could be replaced with rams, bead breakers or the like.

FIGS. 2 and 3*a-f* show the high-pressure hydraulic manifold charging system 26 of the present invention. The present system 18 includes a hydraulic line 20 of the system of the vehicle, which provides pressurized fluid to the manifold device 26, then to the hydraulic system to operate the crane 12 or rotating pads 14. The hydraulic line 20 provides fluid flow into the manifold 26, which houses a hydraulic motor 30 that drivingly operates a high-pressure hydraulic pump 32. The hydraulic line 20 additionally has at least one directional valve for directing fluid flow to the high pressure manifold system and desired components of the above-ground jack or ram 22. One or more of these electrically actuated valves appear at separate points in the casing are electronically and/or mechanically connected between the system 18 and hydraulic line 20 of the vehicle.

A preferred embodiment of the present invention as it connects with the service vehicle is shown in FIG. 4. The manifold is fluidly connected to the high-pressure hydraulic line 28 housed on the hose reel 76. The variety of ports 60, 62, 64, 66, 68, the power input 72, key on power to heater 74, as well as an oil pump 78, and the crane oil tank 80, and the existing crane valve bank 82. Electrically connected to the high-pressure hydraulic pump 32 and electrically actuated valve 36 is a hand-operated electronic radio remote controller 40. The electronic radio remote controller 40 has a plurality of buttons 42, which are used to operate the electronic radio remote controller 40. The controller 40 operates to send a signal to the valve to provide flow to hydraulic motor 30 in order to activate the hydraulic pump 32 so that high-pressure fluid can be delivered from the hydraulic line 20 of the hydraulic manifold 26 to the high pressure hose 28. The controller can also send a second signal to electrically actuated valve 36 to relieve pressurized fluid from the hose 28 or auxiliary device 22 so that the fluid flows back to the hydraulic reservoir 24.

In preferred embodiments, the manifold 26 contains the motor 30, pump 32 and filter 32, the line 20 connecting the various components and running to and from the fluid reservoir 24 by way of the heater 58. One of the advantages of the present invention 18 is maintaining a constant supply of heated and ready to use hydraulic fluid ready to use in the various auxiliary applications. One aspect of the reservoir in this embodiment is that it also contains a sight glass 48 for quantifying the contents of the reservoir 24. This embodiment also features a hydraulic flow control 50, purge port 52, manual toggle switch 54, DC power input 56, 120 watt heater 58, and a variety 60 of ports 62, 64, 66, 68 for routing the hydraulic fluid, and a pressure gauge 70. The present invention is equipped with one or more hydraulic lines 20 and couplers for quick and easy attachment and detachment from the service vehicle. When the charger is connected to the service vehicle, it is able to draw hydraulic fluid into a heated fluid reservoir 24, where it is then ready to be put into use by the charger in operation of the auxiliary device (not shown). In preferred embodiments, the hydraulic line 20 provides fluid flow into a manifold 26 that houses a hydraulic motor 30 that drivingly operates a hydraulic pump 32. In a preferred embodiment, the reservoir has a 4 gallon capacity and the high-pressure hydraulic pump is able to deliver 1.5 gpm at 10,000 psi as long as hydraulic flow is being delivered from the hydraulic line 20 between 7 and 40 gpm at a minimum pressure of 2500 psi. The pump 32 conveys high pressure fluid to above-ground jack, ram lifting device or bead breaker 22, which operates to lift, install, or repair large industrial equipment as desired. The hydraulic line 20 additionally has at least one directional valve for directing fluid flow to the desired components.

In preferred embodiments, there is at least one electrically actuated valve 36 that in a preferred embodiment is a solenoid actuated valve. In preferred embodiments, each of the valves is independent of one another, and the electronic device simultaneously activates each of the valves. In this embodiment, one electrically actuated valve 36 is connected to the hydraulic line 20 of the vehicle and thus provides fluid flow to the tank or hydraulic reservoir 24. Along the fluid flow path is a filter 38 for filtering fluid before going back to the hydraulic line 20 of the vehicle 10.

Electrically connected to the hydraulic pump 32 and electrically actuated valve 36 is an electronic controller 40. The electronic controller 40 has a plurality of buttons 42 that are used to operate the electronic controller 40. The controller 40 operates to send a signal to the hydraulic pump 32 in order to activate the hydraulic pump 32 so that fluid can be diverted from the hydraulic line 20 of the vehicle to the hydraulic motor 30 to operate the hydraulic pump 32 to provide high pressure fluid to the auxiliary device 22. The controller can also send a second signal to electrically actuated valve to relieve pressurized fluid from auxiliary device 22 so that the fluid flows back to the hydraulic line 20.

In operation, an individual turns on the electronic controller 40 and actuates a button 42 in order to turn on the hydraulic pump 32. By turning on the hydraulic pump 32 this starts delivering flow to the auxiliary device 22 from the high pressure hydraulic pump 32. During this process the vehicle functions are inoperable until the hydraulic pump 32 is shut off by releasing the button 42. After the button 42 is released, the hydraulic pump 32 is turned off and the lifting device is pressurized until an operator releases the pressure.

Once the button 42 is released and the hydraulic pump 32 is no longer operating, fluid flow from reservoir 24 continues to flow through hydraulic line 20 so that the hydraulic systems of the vehicle 10 can operate as needed. Once one desires to depressurize the system 18, a button 42 may be pressed on the electronic controller 40 to send a signal to the electrically actuated valve 36 in order to provide a fluid flow path from the system 18 to the hydraulic line 20 to depressurize the system 18.

Preferred embodiments of the present invention include a number of safety features that represent improvements over the prior art. Rather than utilizing a foot pedal, the present invention utilizes a remote hand-operated electronic remote controller 40 for operation. In operation, an individual turns on the electronic controller 40 and operates a button or buttons 42 in order to activate the hydraulic pump 32. By activating the hydraulic pump 32 this starts delivering flow to the auxiliary device 22 from the high pressure hydraulic pump 32. During this process the vehicle functions are typically inoperable until the hydraulic pump 32 is shut off by again operating the button 42. After the button 42 is released, the hydraulic pump 32 is turned off and the lifting device is pressurized until an operator releases the pressure. Once the button 42 is released and the hydraulic pump 32 is no longer operating, fluid flow from reservoir 24 continues to flow through hydraulic line 20 so that the hydraulic systems of the vehicle 10 can operate as needed. Once the user desires to depressurize the auxiliary device 22, a button 42 may be pressed on the electronic controller 40 to send a signal to the electrically actuated valve 36 in order to provide a fluid flow path from the auxiliary device 22 to the hose 28 or auxiliary device 22 to depressurize the system 18, return hydraulic fluid to reservoir tank 24. In some embodiments, an electrical override is included as a safety feature.

Thus provided is an improved hydraulic system, which uses fluid from a vehicle's existing hydraulic system without affecting the vehicle's hydraulic system and performance. Specifically, the hydraulic pump 32 takes priority to the vehicle's hydraulics when activated by diverting system flow from the vehicle's hydraulics through manifold 26 in order to maintain a constant flow to hydraulic motor 30, thus driving and actuating hydraulic pump 32. As a result, the hydraulic pump 32 is a stand-alone hydraulic system. Consequently, a system is provided, which utilizes hydraulic fluid instead of air thus preventing freezing of the system. In addition, because hydraulic pressure and fluid is used, a smooth raising and lowering motion is provided preventing ratcheting of auxiliary device 22. In addition, utilization of the filter 38 ensures that the hydraulic fluid remains clean preventing potential for freezing of hydraulic fluid within the line. Also, because of the electronic radio remote controller 40, which may be operated remotely from the vehicle 10, a safer system is presented. Thus, at the very least, all of the stated objectives have been met.

It will be appreciated by those skilled in the art that other various modifications could be made to the advice without departing from the spirit and scope of this invention.

What is claimed is:

1. A hydraulic manifold system for providing high-pressure hydraulic oil to an auxiliary hydraulic high-pressure above-ground jack or ram to raise, install, or repair field equipment, comprising:

a. a hydraulic line of the vehicle;
b. a hydraulic motor in fluid communication with the hydraulic line;
c. a hydraulic pump drivingly connected to the hydraulic motor;
d. a reservoir for storing the hydraulic fluid, and in fluid communication with the pump;
e. an auxiliary apparatus, hydraulically actuated by fluid from the hydraulic pump;
f. an electrically actuated valve fluidly connected between the hydraulic line of the vehicle and the hydraulic manifold system;
g. a heating element operationally attached to the reservoir to maintain a constant temperature of the fluid; and
h. an electronic controller electrically connected to the hydraulic pump to remotely activate the pump;

wherein the auxiliary apparatus is an above-ground jack.

2. The hydraulic manifold system of claim 1, wherein the auxiliary apparatus is an above-ground jack.

3. The hydraulic manifold system of claim 1, wherein the auxiliary apparatus is a bead breaker.

4. The hydraulic manifold system of claim 1, wherein the auxiliary apparatus is a ram.

5. The hydraulic manifold system of claim 1, wherein the manifold is operable without use of the service vehicle hydraulic system.

6. The hydraulic manifold system of claim 1, wherein the pump is powered by the service vehicle electrical system.

7. The hydraulic manifold system of claim 1, further comprising a magnet attached to the electronic controller for easy attachment to the service vehicle.

8. The hydraulic manifold system of claim 1, wherein when actuated the electronic controller sends a signal to the hydraulic pump so as to divert fluid from the hydraulic line of the vehicle to the hydraulic motor such that pressurized hydraulic fluid is provided by the pump to the crane lifting device.

9. The hydraulic manifold system of claim 1, wherein when actuated, the electronic controller sends a signal to the electrically actuated valve to open a flow path between the crane lifting device and the hydraulic line of the vehicle to relieve pressure at the crane lifting device.

10. The hydraulic manifold system of claim 1, wherein the electronic controller activates the pump from a location remote of the pump.

* * * * *